United States Patent

Wennberg

[15] 3,648,860
[45] Mar. 14, 1972

[54] DEVICE FOR FEEDING MATERIAL OUT OF SILOS OR FROM STACKS

[72] Inventor: Olov Carl Gustav Wennberg, Bjurbacksgatan 8, Karlstad, Sweden

[22] Filed: Mar. 5, 1970

[21] Appl. No.: 16,654

[30] Foreign Application Priority Data

Mar. 13, 1969 Sweden..................................3459/69

[52] U.S. Cl.......................................................214/17 DA
[51] Int. Cl.........................................................B65g 65/46
[58] Field of Search ...........................................214/17 DA

[56] References Cited

UNITED STATES PATENTS 3,084,814  4/1963  Schaefer ..........................214/17 DA

FOREIGN PATENTS OR APPLICATIONS 1,503,988  10/1967  France..............................214/17 DA Primary Examiner—Robert G. Sheridan
Attorney—Young & Thompson

[57] ABSTRACT

The invention concerns a device for feeding of material from a bottom supporting said material to a central outlet by means of a feed screw performing a wandering movement about the center of the bottom and a rotation about its own axis and in which the driving means for the screw are mounted onto a turning disk mounted in the center of the bottom and surmounted by a protecting casing. The invention intends to prevent the often occurring formation of vaults in the material. To this purpose the casing leaves a portion of the turning disk uncovered and has a feed edge extending downwards towards the disk so as to drive off the material from the outlet opening during rotation of the disk and thereby improve its uniform feed through the outlet opening.

4 Claims, 5 Drawing Figures

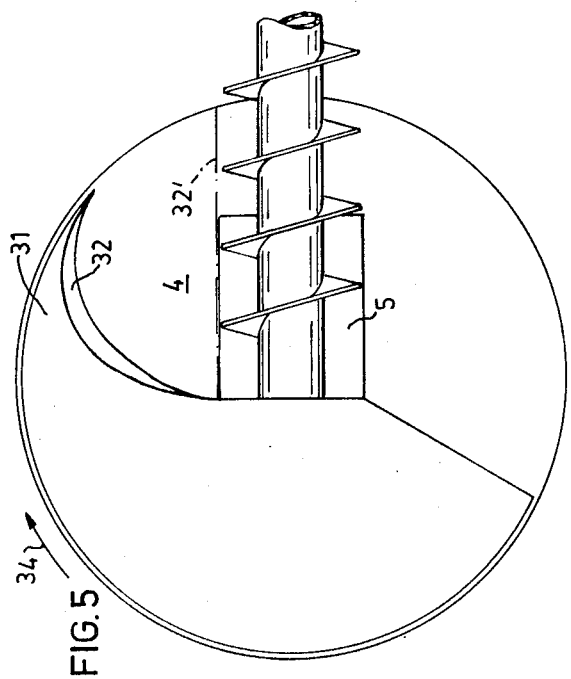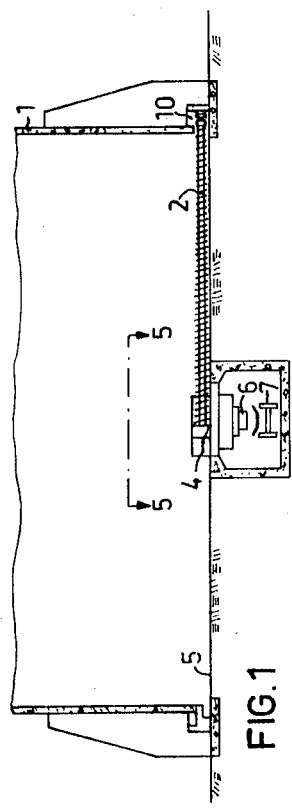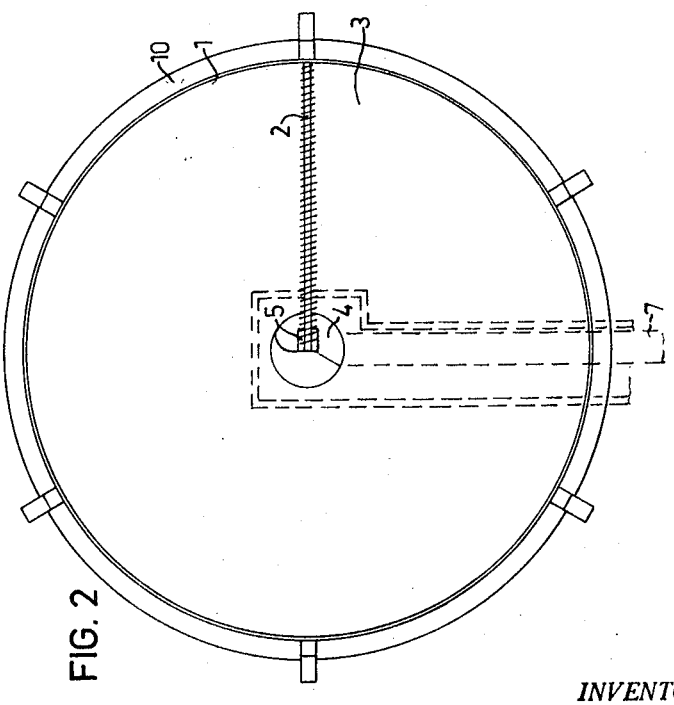

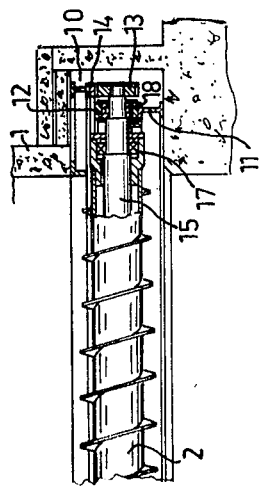
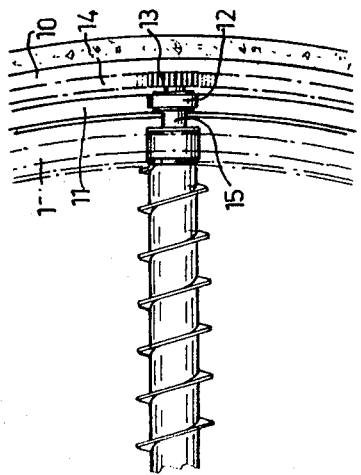
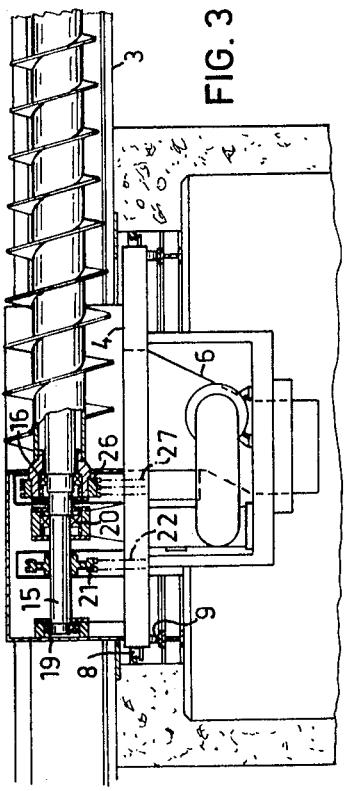
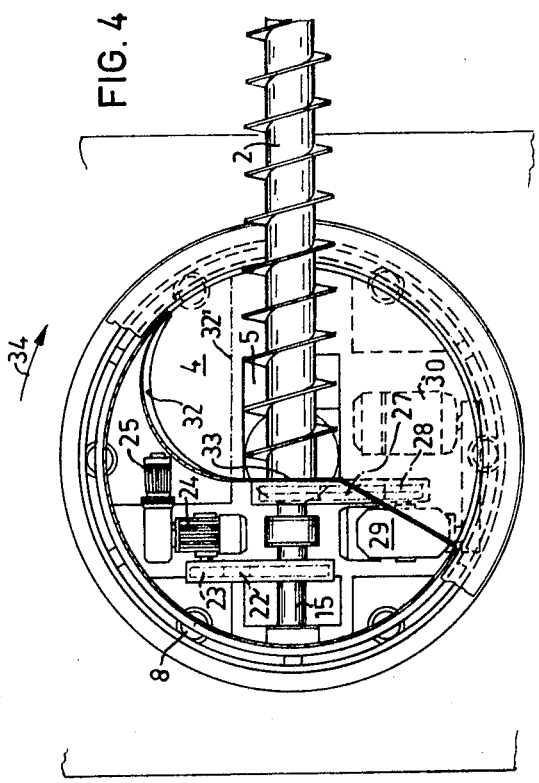
FIG. 3
FIG. 4
INVENTOR.
OLOV CARL GUSTAV WENNBERG
BY Young & Thompson
ATTYS.

DEVICE FOR FEEDING MATERIAL OUT OF SILOS OR FROM STACKS

The present invention concerns a device for feeding material from a bottom e.g., of a silo or beneath a stack by means of a screw and a turning device, which in known manner rotates the screw about its own axis and simultaneously produces a circular wandering motion of the screw over the bottom, the driving means being supported by a turn disk mounted centrally onto the bottom and covered by a protecting casing. In previously known devices the rotatable screw is mounted on a pinion or a housing placed in the center of an outlet opening disposed centrally in the bottom. This arrangement gives often rise to the formations of vaults hindering or entirely preventing the feeding out of the material. This invention intends to obviate this disadvantage and to attain such a form of the casing and the turning disk that an uniform feed of the material without vault formation can be obtained.

The primary characteristics of the invention is that the casing leaves a portion of the turning disk uncovered and forms a feeding edge extending down towards the turning disk, said feeding edge upon rotation of the disk and the casing pushing off the material to facilitate its falling down into an outlet opening in the turning disk. The feeding edge can be shaped as a plough wing which because of its shape tends to collect the material and to lead it towards the outlet opening in the turning disk.

A further improvement of the feeding of the material can be obtained, if the feeding edge in the center of the casing merges into a vertical wall situated close to the outlet opening, which wall is traversed by a shaft, on which the screw is mounted. A further improved structure is obtained, if the screw shaft, which extends diametrally through the casing, is supported both at the periphery of the bottom and at two places between the vertical wall and the periphery of the casing. The turning disk, which supports the driving means can have a part of them mounted at its underside, while others can be mounted on its upper side under protection of the casing. The driving means here concerned comprise both means to produce the circular wandering motion of the screw and means to rotate the screw about its axis.

An embodiment of the invention will be described in the following with reference to the accompanying drawings.

FIG. 1 shows a diagrammatic vertical section through the lower part of a silo with the feeding device mounted therein.

FIG. 2 shows a plane view of the device illustrated in FIG. 1.

FIG. 3 shows at an enlarged scale a side view of the screw and driving means, partly in vertical section through the axis of the screw.

FIG. 4 shows a plane view corresponding to FIG. 3.

FIG. 5 shows at a still more enlarged scale the turning disk, the casing and the adjacent end portion of the screw seen as from line 5—5 in FIG. 1.

In the drawings, 1 is the lower most often cylindrical part of a silo wall, 2 is a feed screw mounted in the lower part of the silo and 3 is the bottom of the silo. A turning disk 4 is mounted in a central opening of the bottom, which disk has an outlet opening 5. From this opening the material fed towards it by the screw is led through a hopper 6 onto a conveyor 7. The turning disk is peripherally guided by rollers 8 and supported by rollers 9. An annular guide rail 11 extends within a channel 10 at the outside of the lower end of the silo wall, on which rail runs a wheel 12. The wheel 12 is mounted on a shaft 15 which drives the wheel 12 by means of a gear 13 mounted onto the end of the shaft and engaging a fixed circular rack 14, the rotation of the shaft producing the wandering of the screw over the silo bottom 3. The tubular screw 2, through which the shaft 15 is extending, is mounted onto the shaft by means of two bearings 16 and 17. The running wheel 12 is by means of a bearing 18 mounted onto the end of the shaft 15 situated near the periphery of the silo and on the other end of the shaft situated on the turning disk 4 there are two bearings 19 and 20 and a chain wheel 21. This wheel drives shaft 15 by means of a transmission chain 22, a chain gear 23, a worm gear 24 and an electromotor 25 and produces the rotation of the screw 2 so that it wanders over the bottom 3. The screw 2 is rotated by means of a chain wheel 26, a chain 27, a chain gear 28 and a worm gear 29 driven by an electromotor 30.

Some of the driving means above described are mounted onto the underside of the turning disk 4 and are protected by the latter, while the others are placed on the upper side of the disk and protected by the casing 31. This casing covers only a portion of the turning disk and leaves another portion of it free in front of and behind the outlet opening 5. Behind the outlet opening the casing is inclined downwards towards the turning disk and forms a feed down edge in the form of a plough wing 32, which slightly besides the center of the disk merges into a vertical wall, traversed by the shaft 15 of the screw. Instead of being formed as a plough wing, the edge 32 can extend in a straight line as marked by the mixed line 32'.

When the device is working and the screw is wandering around the bottom of she silo simultaneously as it rotates about its own axis, the turning disk 4 rotates in the direction indicated by the arrow 34. The material in the silo, which comes into contact with the screw, is fed by it towards the outlet opening 5. The casing rotating with the turning disk assists in feeding down the material towards the outlet opening and prevents also the forming of vaults in the material, so that an uniform feed is obtained.

It should be observed that the screw extends from the periphery of the silo to the turning disk and past its center to the vertical or slightly inclined wall 33, for which reason it can act on the material in the silo over the totality of its bottom surface. In order to render the screw fully effective also near the casing, its threading should extend a little above the top side of the casing.

The driving means for the rotation of the screw about its axis and for its wandering over the bottom of the silo may be located near the periphery of the silo instead of beneath the turning disk, the casing serving then mainly to improve the feeding down of the material and to protect the bearings of the screw shaft.

What I claim is:

1. A bottom unloader comprising a screw conveyor, means for swinging said screw conveyor in a horizontal path about an upright axis and for rotating said screw conveyor about its own axis to move material toward said upright axis, a horizontal disc coaxial with said upright axis and turning with said screw conveyor about said upright axis and having a central outlet opening, a casing surmounting a portion only of said disc and leaving a portion of said disc exposed, said casing having a feeding down edge that extends downward toward the disc, said disc having at least a component of its length extending along said screw conveyor in a direction away from said upright axis whereby said edge during rotation of the disc and of the casing pushes off material to facilitate material falling through said outlet opening.

2. An unloader as claimed in claim 1, said feeding down edge having the shape of a plow wing.

3. An unloader as claimed in claim 1, said feeding down edge adjacent the center of the casing merging into a vertical wall disposed along an edge of said outlet opening and traversed by a central shaft of said screw conveyor.

4. An unloader as claimed in claim 1, said means for swinging and rotating said screw conveyor being supported by said disc partly on the upper side of said disc and partly on the under side of said disc.

* * * * *